(12) United States Patent
Diorio et al.

(10) Patent No.: US 8,354,917 B2
(45) Date of Patent: *Jan. 15, 2013

(54) RFID TAG CHIPS AND TAGS COMPLYING WITH ONLY A LIMITED NUMBER OF REMAINING COMMANDS AND METHODS

(75) Inventors: Christopher J. Diorio, Shoreline, WA (US); Casey M Hagen, Seattle, WA (US); Omar Khwaja, Irvine, CA (US)

(73) Assignee: Impinj, Inc., Seattle, WA (US)

( * ) Notice: Subject to any disclaimer, the term of this patent is extended or adjusted under 35 U.S.C. 154(b) by 992 days.

This patent is subject to a terminal disclaimer.

(21) Appl. No.: 12/035,379

(22) Filed: Feb. 21, 2008

(65) Prior Publication Data

US 2008/0204195 A1    Aug. 28, 2008

Related U.S. Application Data

(60) Provisional application No. 60/902,746, filed on Feb. 21, 2007, provisional application No. 60/933,222, filed on Jun. 5, 2007.

(51) Int. Cl.
*H04Q 5/22* (2006.01)

(52) U.S. Cl. .................. 340/10.1; 340/10.4; 340/10.51; 340/572.1

(58) Field of Classification Search .............. 340/10.4, 340/10.51, 572.1
See application file for complete search history.

(56) References Cited

U.S. PATENT DOCUMENTS

| | | | | |
|---|---|---|---|---|
| 3,835,403 A * | 9/1974 | Leinemann | ............... | 327/126 |
| 4,322,845 A | 3/1982 | Fennel et al. | | |
| 4,829,169 A * | 5/1989 | Watanabe | ............... | 235/492 |
| 4,912,629 A | 3/1990 | Shuler, Jr. | | |
| 5,550,547 A * | 8/1996 | Chan et al. | ............... | 342/42 |
| 5,619,734 A * | 4/1997 | Yabusaki | ............... | 710/62 |
| 5,835,778 A * | 11/1998 | Yoshihara | ............... | 717/168 |
| 6,002,344 A | 12/1999 | Bandy et al. | | |
| 6,089,453 A * | 7/2000 | Kayser et al. | ............... | 235/383 |
| 6,191,727 B1 * | 2/2001 | Springer et al. | ............... | 342/195 |
| 6,271,787 B1 * | 8/2001 | Springer et al. | ............... | 342/195 |
| 6,275,183 B1 * | 8/2001 | Springer | ............... | 342/195 |

(Continued)

FOREIGN PATENT DOCUMENTS

EP    1172755 A1 *  1/2002

(Continued)

OTHER PUBLICATIONS

Smart Card Alliance Identity Council. "Countless Smart Cards vs. EPC Gen 2 RFID Tags: Frequently Asked Questions." Smart Card Alliance (2006). Jul. 2006: 1-6.

(Continued)

*Primary Examiner* — George Bugg
*Assistant Examiner* — Paul Obiniyi
(74) *Attorney, Agent, or Firm* — Turk IP Law, LLC

(57) ABSTRACT

RFID tags and chips for RFID tags are capable of complying with only a limited number of remaining commands, and methods. In a number of embodiments, a counter is adjusted in association with receiving a command and complying with it. The tag complies until the counter reaches a limit, and then it can stop complying. Non-compliance can be by the tag becoming quiet, or performing other activities, or performing nothing at all, or performing only selected activities, and so on. In some embodiments non-compliance is permanent, while in others it is temporary and/or restorable.

22 Claims, 11 Drawing Sheets

RFID TAG METHODS

U.S. PATENT DOCUMENTS

| | | | |
|---|---|---|---|
| 6,445,420 B1 * | 9/2002 | Kim | 348/465 |
| 6,538,563 B1 * | 3/2003 | Heng | 340/10.2 |
| 6,650,228 B1 | 11/2003 | Vacherand et al. | |
| 6,677,852 B1 * | 1/2004 | Landt | 340/10.1 |
| 6,751,259 B2 * | 6/2004 | Zhang et al. | 375/240.26 |
| 6,988,667 B2 | 1/2006 | Stewart et al. | |
| 7,009,496 B2 | 3/2006 | Arneson et al. | |
| 7,009,518 B2 * | 3/2006 | Liao et al. | 340/572.1 |
| 7,019,664 B2 * | 3/2006 | Turner et al. | 340/9.1 |
| 7,035,818 B1 | 4/2006 | Bandy et al. | |
| 7,088,246 B2 | 8/2006 | Fukuoka | |
| 7,161,469 B2 * | 1/2007 | Turner et al. | 340/10.2 |
| 7,172,115 B2 * | 2/2007 | Lauden | 235/380 |
| 7,330,118 B2 | 2/2008 | Durham et al. | |
| 7,362,212 B2 * | 4/2008 | Burghard et al. | 340/10.2 |
| 7,504,929 B2 * | 3/2009 | Oh et al. | 340/10.51 |
| 7,562,083 B2 * | 7/2009 | Smith et al. | 1/1 |
| 7,587,195 B2 * | 9/2009 | Ichikawa | 455/343.1 |
| 7,710,596 B2 * | 5/2010 | Shibao | 358/1.9 |
| 7,716,208 B2 * | 5/2010 | Smith et al. | 707/713 |
| 7,717,349 B2 | 5/2010 | Akiyama et al. | |
| RE41,530 E * | 8/2010 | Wood, Jr. | 370/329 |
| 7,844,505 B1 | 11/2010 | Arneson et al. | |
| 7,936,706 B2 * | 5/2011 | Wood, Jr. | 370/312 |
| 8,102,244 B2 * | 1/2012 | Smith | 340/10.2 |
| RE43,254 E * | 3/2012 | Wood, Jr. | 370/329 |
| 8,174,365 B2 * | 5/2012 | Akiyama et al. | 340/10.2 |
| 2001/0040525 A1 * | 11/2001 | Springer et al. | 342/195 |
| 2002/0024422 A1 * | 2/2002 | Turner et al. | 340/10.3 |
| 2002/0153996 A1 | 10/2002 | Chan et al. | |
| 2003/0019929 A1 * | 1/2003 | Stewart et al. | 235/385 |
| 2003/0169168 A1 | 9/2003 | Soto et al. | |
| 2003/0182327 A1 * | 9/2003 | Ramanujam et al. | 707/204 |
| 2003/0214389 A1 | 11/2003 | Arneson et al. | |
| 2003/0228857 A1 * | 12/2003 | Maeki | 455/278.1 |
| 2004/0065733 A1 | 4/2004 | Fukuoka | |
| 2004/0111338 A1 | 6/2004 | Bandy et al. | |
| 2004/0201455 A1 | 10/2004 | Hulvey | |
| 2004/0257204 A1 * | 12/2004 | Liao et al. | 340/10.2 |
| 2005/0027604 A1 | 2/2005 | Bandy et al. | |
| 2005/0128084 A1 * | 6/2005 | Hoshina | 340/572.1 |
| 2005/0199716 A1 | 9/2005 | Shafer et al. | |
| 2005/0263591 A1 * | 12/2005 | Smith | 235/385 |
| 2006/0022058 A1 | 2/2006 | Akiyama et al. | |
| 2006/0022798 A1 | 2/2006 | Akiyama et al. | |
| 2006/0044114 A1 | 3/2006 | Friedrich et al. | |
| 2006/0071757 A1 * | 4/2006 | Burghard et al. | 340/10.2 |
| 2006/0091196 A1 | 5/2006 | Durham et al. | |
| 2006/0123041 A1 * | 6/2006 | Sandrini et al. | 707/102 |
| 2006/0124737 A1 | 6/2006 | Oh et al. | |
| 2006/0152342 A1 * | 7/2006 | Turner et al. | 340/10.2 |
| 2006/0170534 A1 | 8/2006 | Arneson et al. | |
| 2006/0224647 A1 * | 10/2006 | Gutnik | 708/250 |
| 2006/0261951 A1 * | 11/2006 | Koerner et al. | 340/572.1 |
| 2007/0069852 A1 | 3/2007 | Mo et al. | |
| 2007/0069863 A1 * | 3/2007 | Akiyama et al. | 340/10.2 |
| 2007/0069865 A1 * | 3/2007 | Akiyama et al. | 340/10.2 |
| 2007/0085661 A1 * | 4/2007 | Yamazoe et al. | 340/10.1 |
| 2007/0115098 A1 * | 5/2007 | Dobkin | 340/10.2 |
| 2007/0120651 A1 * | 5/2007 | Kobayashi et al. | 340/10.51 |
| 2007/0126555 A1 | 6/2007 | Bandy | |
| 2007/0176751 A1 * | 8/2007 | Cesar et al. | 340/10.32 |
| 2008/0150691 A1 | 6/2008 | Knadle et al. | |
| 2008/0150728 A1 | 6/2008 | Hoshina | |
| 2008/0197979 A1 * | 8/2008 | Enyedy et al. | 340/10.1 |
| 2008/0270744 A1 * | 10/2008 | Hashimoto | 711/217 |
| 2009/0040021 A1 | 2/2009 | Seo et al. | |
| 2009/0058603 A1 * | 3/2009 | Seppa et al. | 340/10.1 |
| 2009/0113194 A1 * | 4/2009 | Orita et al. | 713/1 |
| 2009/0115580 A1 * | 5/2009 | Koerner et al. | 340/10.1 |

FOREIGN PATENT DOCUMENTS

| | | |
|---|---|---|
| EP | 1734460 A2 * | 12/2006 |
| GB | 2267167 | 11/1993 |
| JP | 2006067600 | 3/2006 |
| JP | 2010104504 A * | 5/2010 |

OTHER PUBLICATIONS

Notice of Allowance, U.S. Appl. No. 12/035,372 mailed Sep. 17, 2012.

* cited by examiner

RFID SYSTEM

RFID TAG

RFID TAG COMPONENTS

RFID READER SYSTEM CONFIGURATION WITH OPTIONAL LOCAL AND REMOTE COMPONENTS

| ITEM | COMMAND | TARGET | ACTION | MEMBANK | POINTER | LENGTH | MASK | TRUNCATE | CRC-16 |
|---|---|---|---|---|---|---|---|---|---|
| # OF BITS | 4 | 3 | 3 | 2 | EBV | 8 | VARIABLE | 1 | 16 |
| DESCR. | 1010 | 000: Inventoried (S0)<br>001: Inventoried (S1)<br>010: Inventoried (S2)<br>011: Inventoried (S3)<br>100: SL<br>101: RFU<br>110: RFU<br>111: RFU | See Table 6.18 | 00: RFU<br>01: EPC<br>10: TID<br>11: User | Starting Mask address | Mask length (bits) | Mask value | 0: Disable truncation<br>1: Enable truncation | |

*TABLE 6.17 - SELECT COMMAND OF THE GEN2 SPEC VERSION 1.1.0*

FIG. 12A

| | Membank | Pointer | Length | Mask | | | | | |
|---|---|---|---|---|---|---|---|---|---|
| | | | | FEF | | | FCF | | |
| | | | | Subfield_1 | ... | Subfield_N | Command code | Data | |
| # of bits | 2 | EBV | 8 | Variable | | Variable | 5 | Variable | |
| description | - | - | - | - | | - | - | - | |

*SUBDIVIDING THE MASK FIELD*

FIG. 12B

| | Membank | Pointer | Length | Mask | | | | | |
|---|---|---|---|---|---|---|---|---|---|
| | | | | FEF | | | FCF | | |
| | | | | Class ID | MDID | Indicator | Command code | Data | |
| # of bits | 2 | EBV | 8 | 2 | 12 | 1 | 5 | Variable | |
| description | 10 | 06h | 14h | 10 | 000000000001 | 1 | 00000 | - | |

*EXAMPLE*

FIG. 12C

RFID TAG CHIPS AND TAGS COMPLYING WITH ONLY A LIMITED NUMBER OF REMAINING COMMANDS AND METHODS

CROSS REFERENCE TO RELATED APPLICATIONS

This application claims priority from U.S.A. Provisional Application Ser. No. 60/902,746, filed on Feb. 21, 2007, the disclosure of which is hereby incorporated by reference for all purposes.

This application claims priority from U.S.A. Provisional Application Ser. No. 60/933,222, filed on Jun. 5, 2007, the disclosure of which is hereby incorporated by reference for all purposes.

This application may be found to be related to U.S. patent application Ser. No. 12/035,372 by the same inventors, titled "CAUSING RFID TAG TO CHANGE HOW MANY REMAINING COMMANDS IT WILL COMPLY WITH", filed by the same assignee on the same day as the instant application.

FIELD OF THE INVENTION

The present description is about Radio Frequency IDentification (RFID) systems and more specifically for systems where RFID tags reply to readers only a limited number of times.

BACKGROUND

Radio Frequency IDentification (RFID) systems typically include RFID tags and RFID readers. RFID readers are also known as RFID reader/writers or RFID interrogators. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a radio section, a power management section, and frequently a logical section, a memory, or both. In earlier RFID tags, the power management section included an energy storage device, such as a battery. RFID tags with an energy storage device are known as active or semi-active tags. Advances in semiconductor technology have miniaturized the electronics so much that an RFID tag can be powered solely by the RF signal it receives. Such RFID tags do not include an energy storage device, and are called passive tags.

It is desired to have RFID systems with additional capabilities, for improved functionality. For example, there are concerns that tags will be counterfeited without authorization. In addition, there are security concerns where tags have been attacked, so as to unravel their on-board passwords bit-by-bit.

BRIEF SUMMARY

The invention improves over the prior art.

Briefly, the present invention provides RFID tags and chips for RFID tags that are capable of complying with only a limited number of remaining commands, and methods. In a number of embodiments, a counter is adjusted in association with receiving a command and complying with it. The tag complies until the counter reaches a limit, and then it can stop complying.

The present invention further provides RFID reader systems, readers, components, software and methods for causing such RFID tags to change how many remaining commands they will comply with. In a number of embodiments, this is achieved by causing a custom limiting command to be transmitted to a tag.

RFID tags according to embodiments can thus become non-compliant. Non-compliance can be by the tags becoming quiet, or performing other activities, or performing nothing at all, or performing only selected activities, and so on. In some embodiments non-compliance is permanent, while in others it is temporary and/or restorable.

An advantage of the invention is that this non-compliance can help resist having a tag read successively, by those who would unravel its password bit-by-bit. For example, tags can be made with a very low remaining number of subsequent commands that will be complied with, which will hamper the efforts of tag counterfeiters.

These and other features and advantages of the invention will be better understood from the specification of the invention, which includes the following Detailed Description and accompanying Drawings.

BRIEF DESCRIPTION OF THE DRAWINGS

The following Detailed Description proceeds with reference to the accompanying Drawings, in which:

FIG. 12A is a table illustrating the fields of the Select command of the Gen2 Spec version 1.1.0, versions of which may be used as any one or more of the custom limiting commands of FIG. 11 according to embodiments.

FIG. 12B is a table illustrating how a number of custom commands can be enabled in a reader and a tag.

FIG. 12C is a table showing sample values that can be used for the table of FIG. 12B.

DETAILED DESCRIPTION

Figure 1:
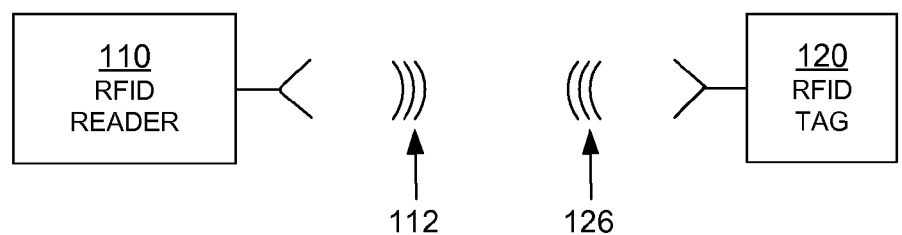
FIG. 1 is a block diagram of components of an RFID system.

The present invention is now described. While it is disclosed in its preferred form, the specific embodiments of the invention as disclosed herein and illustrated in the drawings are not to be considered in a limiting sense. Rather, these embodiments are provided so that this disclosure will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment, an entirely firmware embodiment, or an embodiment combining aspects of the above. This description is, therefore, not to be taken in a limiting sense. The invention is now described in more detail.

FIG. 1 is a diagram of components of a typical RFID system 100, incorporating aspects of the invention. An RFID reader 110 transmits an interrogating Radio Frequency (RF) wave 112. RFID tag 120 in the vicinity of RFID reader 110 may sense interrogating RF wave 112, and generate wave 126 in response. RFID reader 110 senses and interprets wave 126.

Reader 110 and tag 120 exchange data via wave 112 and wave 126. In a session of such an exchange, each encodes, modulates, and transmits data to the other, and each receives, demodulates, and decodes data from the other. The data is modulated onto, and demodulated from, RF waveforms.

Encoding the data in waveforms can be performed in a number of different ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the waveforms are processed internally by reader 110 and tag 120, they can be equivalently considered and treated as numbers having corresponding values, and so on.

Tag 120 can be a passive tag or an active or semi-active tag, i.e. having its own power source. Where tag 120 is a passive tag, it is powered from wave 112.

Figure 2:
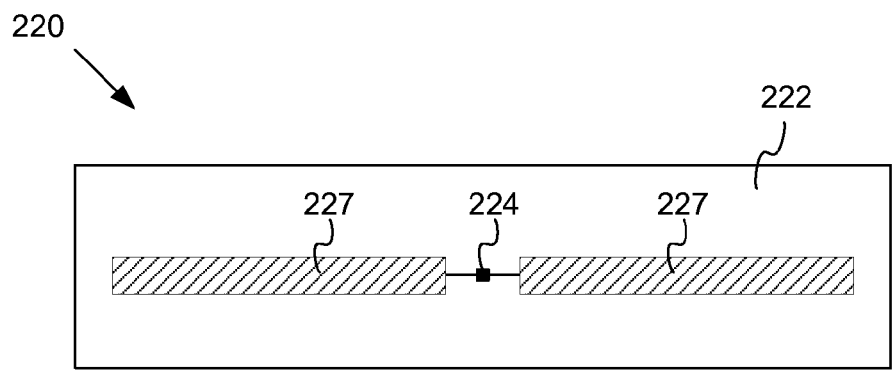
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active tags.

Tag 220 is formed on a substantially planar inlay 222, which can be made in many ways known in the art. Tag 220 includes an electrical circuit, which is preferably implemented in an integrated circuit (IC) 224. IC 224 is arranged on inlay 222.

Tag 220 also includes an antenna for exchanging wireless signals with its environment. The antenna is usually flat and attached to inlay 222. IC 224 is electrically coupled to the antenna via suitable antenna ports (not shown in FIG. 2).

The antenna may be made in a number of ways, as is well known in the art. In the example of FIG. 2, the antenna is made from two distinct antenna segments 227, which are shown here forming a dipole. Many other embodiments are possible, using any number of antenna segments.

In some embodiments, an antenna can be made with even a single segment. Different points of the segment can be coupled to one or more of the antenna ports of IC 224. For example, the antenna can form a single loop, with its ends coupled to the ports. It should be remembered that, when the single segment has more complex shapes, even a single segment could behave like multiple segments, at the frequencies of RFID wireless communication.

In operation, a signal is received by the antenna, and communicated to IC 224. IC 224 both harvests power, and responds if appropriate, based on the incoming signal and its internal state. In order to respond by replying, IC 224 modulates the reflectance of the antenna, which generates the backscatter from a wave transmitted by the reader. Coupling together and uncoupling the antenna ports of IC 224 can modulate the reflectance, as can a variety of other means.

In the embodiment of FIG. 2, antenna segments 227 are separate from IC 224. In other embodiments, antenna segments may alternately be formed on IC 224, and so on.

The components of the RFID system of FIG. 1 may communicate with each other in any number of modes. One such mode is called full duplex. Another such mode is called half-duplex, and is described below.

Figure 3:
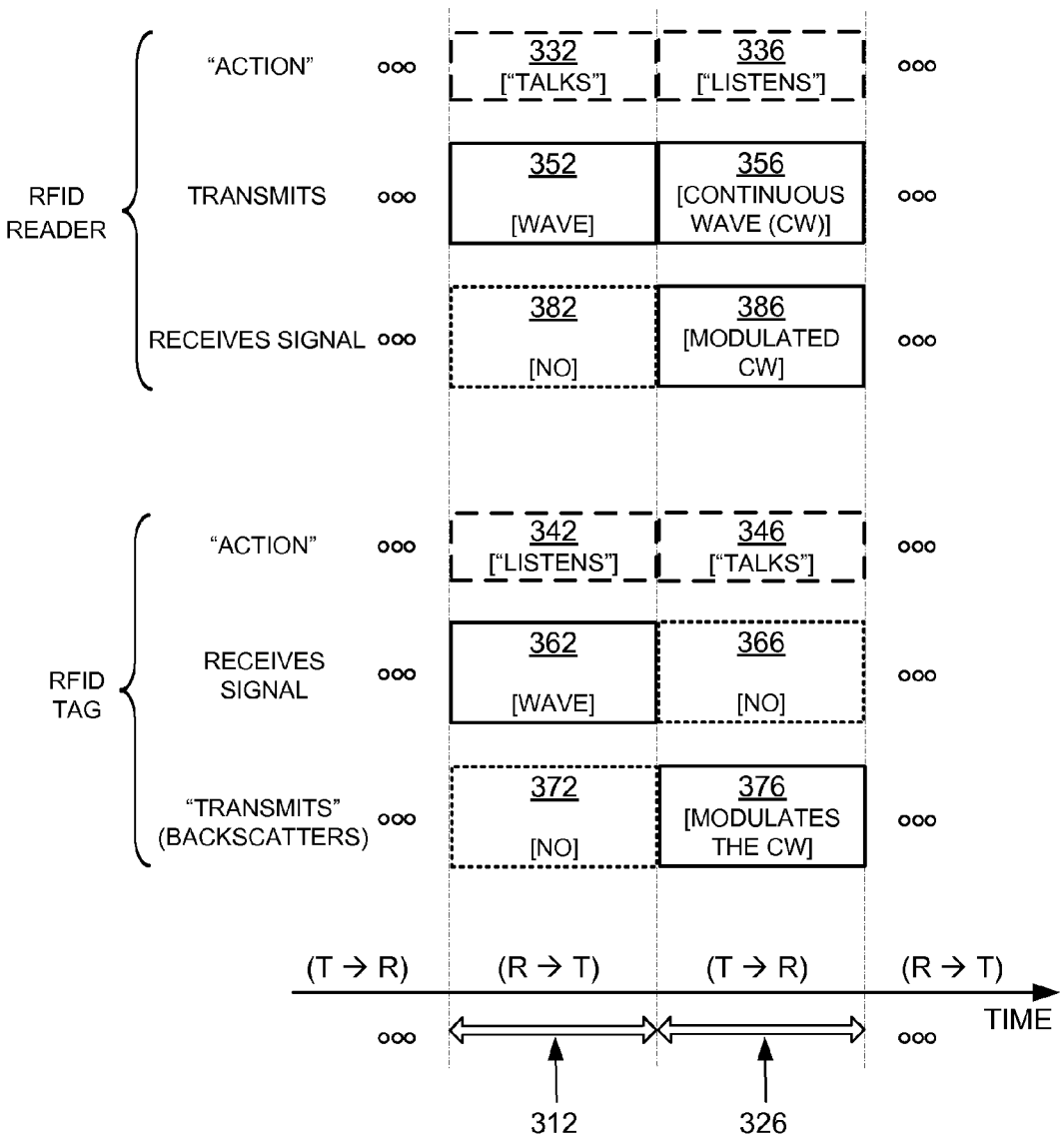
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

In the above, an RFID reader/interrogator may communicate with one or more RFID tags in any number of ways. Some such ways are called protocols. A protocol is a specification that calls for specific manners of signaling between the reader and the tags.

One such protocol is called the Specification for RFID Air Interface—EPC™ Radio-Frequency Identity Protocols Class-1 Generation-2 UHF RFID Protocol for Communications at 860 MHz-960 MHz, which is also colloquially known as "the Gen2 Spec". The Gen2 Spec has been ratified by EPCglobal, which is an organization that maintains a website at: <http://www.epcglobalinc.org/> at the time this document is initially filed with the USPTO. Version 1.1.0 of the Gen2 Spec is hereby incorporated by reference in its entirety.

In addition, a protocol can be a variant of a stated specification such as the Gen2 Spec, for example including fewer or additional commands than the stated specification calls for, and so on. In such instances, additional commands are sometimes called custom commands.

Figure 4:
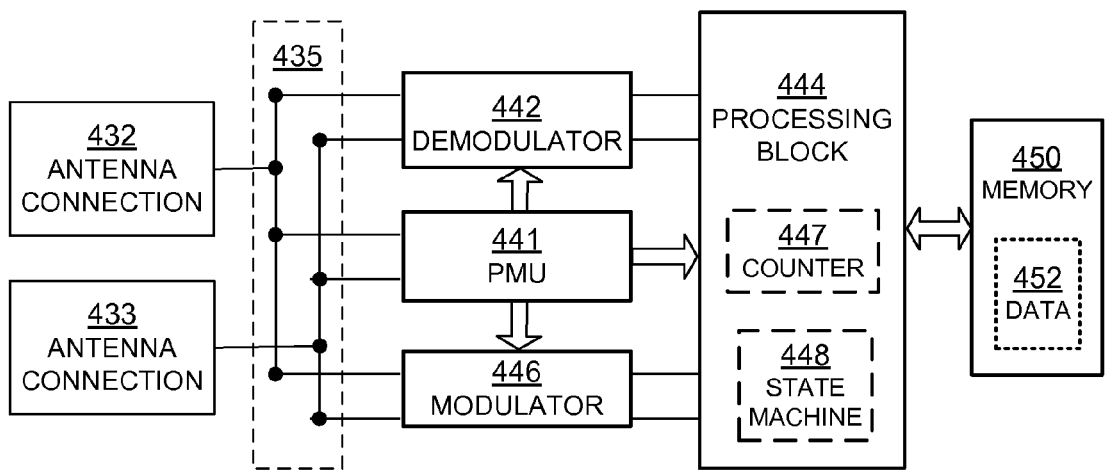
FIG. 4 is a block diagram of an implementation of an electrical circuit formed in an IC of the tag of FIG. 2.

FIG. 4 is a block diagram of an electrical circuit 424 according to embodiments. Circuit 424 may be formed in an IC of an RFID tag, such as IC 224 of FIG. 2. Circuit 424 has a number of main components that are described in this document. Circuit 424 may have a number of additional components from what is shown and described, or different components, depending on the exact implementation.

Circuit 424 includes at least two antenna connections 432, 433, which are suitable for coupling to one or more antenna segments (not shown in FIG. 4). Antenna connections 432, 433 may be made in any suitable way, such as using pads and so on. In a number of embodiments more than two antenna connections are used, especially in embodiments where more antenna segments are used.

Circuit 424 includes a section 435. Section 435 may be implemented as shown, for example as a group of nodes for proper routing of signals. In some embodiments, section 435 may be implemented otherwise, for example to include a receive/transmit switch that can route a signal, and so on.

Circuit 424 also includes a Power Management Unit (PMU) 441. PMU 441 may be implemented in any way known in the art, for harvesting raw RF power received via antenna connections 432, 433. In some embodiments, PMU 441 includes at least one rectifier, and so on.

In operation, an RF wave received via antenna connections 432, 433 is received by PMU 441, which in turn generates power for components of circuit 424. This is true for either or both R→T and T→R sessions, whether or not the received RF wave is modulated.

Circuit 424 additionally includes a demodulator 442. Demodulator 442 demodulates an RF signal received via antenna connections 432, 433. Demodulator 442 may be implemented in any way known in the art, for example including an attenuator stage, an amplifier stage, and so on.

Circuit 424 further includes a processing block 444. Processing block 444 receives the demodulated signal from demodulator 442, and may perform operations. In addition, it may generate an output signal for transmission.

Processing block 444 may be implemented in any way known in the art. For example, processing block 444 may include a number of components, such as a processor, memory, a decoder, an encoder, and so on. It may also include a counter 447, as is described later in this document.

In a number of embodiments, processing block 444 includes a state machine 448. State machine 448 retains the state of the tag, at least while circuit 424 is powered. The state of the tag dictates which of the subsequently received commands the tag would respond to and how, and so on. State machine 448 can be as is called for in the specified communications protocol, and adapted to further accommodate a custom limiting command according to embodiments, with or without contradicting the operation of the protocol.

Circuit 424 additionally includes a modulator 446. Modulator 446 modulates an output signal generated by processing block 444. The modulated signal is transmitted by driving antenna connections 432, 433, and therefore driving the load presented by the coupled antenna segment or segments. Modulator 446 may be implemented in any way known in the art, for example including a driver stage, amplifier stage, and so on.

In one embodiment, demodulator 442 and modulator 446 may be combined in a single transceiver circuit. In another embodiment, modulator 446 may include a backscatter transmitter or an active transmitter. In yet other embodiments, demodulator 442 and modulator 446 are part of processing block 444.

Circuit 424 additionally includes a memory 450, which stores data 452. Memory 450 is preferably implemented as a Nonvolatile Memory (NVM), which means that data 452 is retained even when circuit 424 does not have power, as is frequently the case for a passive RFID tag.

Figure 5:
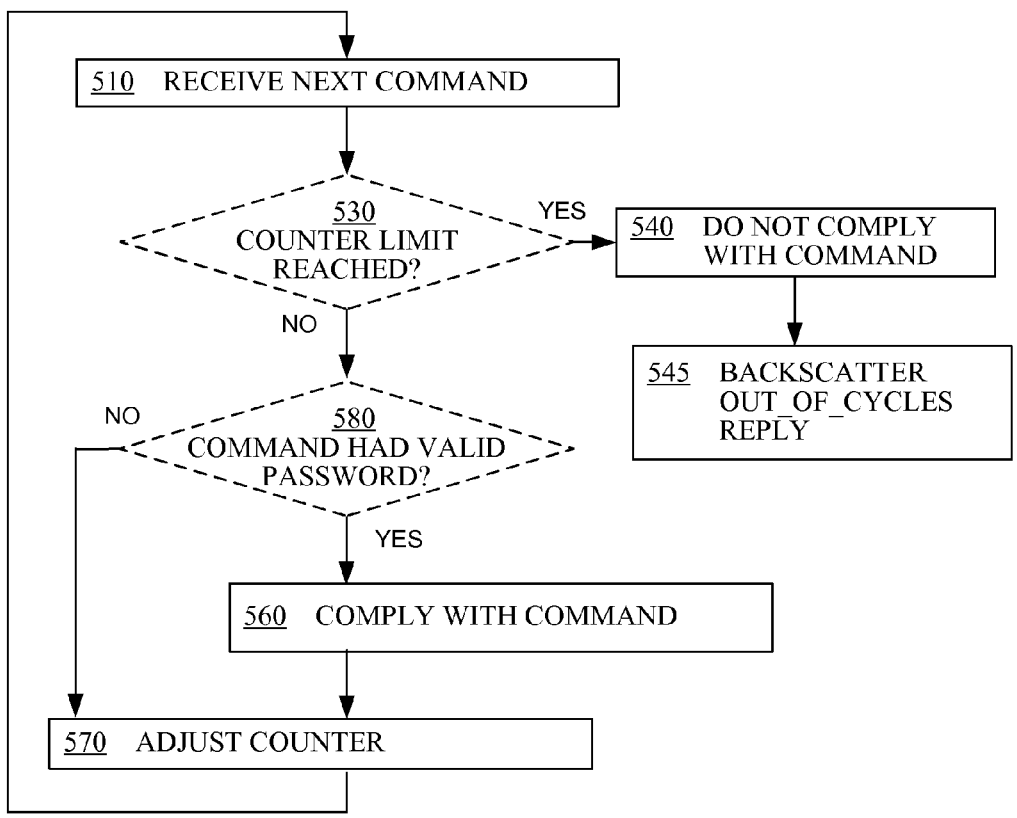
FIG. 5 is a flowchart illustrating methods for a tag according to embodiments.

FIG. 5 is flowchart 500 illustrating methods according to embodiments. The methods of flowchart 500 may be practiced by different embodiments, including but not limited to RFID tag 220, chip 224, circuit 424, and so on.

At operation 510, a first command is received wirelessly from an RFID reader via an antenna. According to the communication protocol in use, this first command calls for the tag to comply by performing a first operation, or a set of operations that include the first operation. Examples of such operations are provided later in this document.

At optional next operation 530, it is determined whether a counter has reached a preset limit. If not, then at next operation 540, the first command is not complied with. This noncompliance can be by the first operation not being performed, and possibly others of the operations not being performed. For example, the first operation could be that a reply is backscattered, but that does not happen. That reply could be a specific reply, or a randomly generated reply.

At an optional further operation 545, an Out_Of_Cycles reply can be backscattered to the first command. The Out_Of_Cycles reply indicates that the tag no longer responds. The Out_Of_Cycles reply can be backscattered every time, only some of the times, only the first time, and so on.

If the counter had not reached its limit, then at next operation 560, the first command is complied with. In other words, the tag performs the first operation, and any other operations mandated by the first command.

At next operation 570, the counter is adjusted, to advance towards the limit. At this point it will be appreciated that the counter and the limit are merely a mechanism for limiting how many more commands the tag will comply with. Beyond that, the tag is out of cycles, as will be described in more detail.

The counter can be implemented in any number of ways. For example, the counter can be adjusted by being incremented up to a limit, or being decremented down to a limit. In some embodiments, the counter can start with a positive value, and be adjusted by being decremented down to a limit of zero, which is also the example that will be used later in this document. The counter can be a single counter. Or there can be a combination of two or more counters, with equal or different coefficients. One or more of these counters can be adjusted according to a deterministic process. Or according to a non-deterministic process, instead. For example, the counter can permit only one decrement, but that has to happen according to a condition that can be met at random, and so on. In addition, the counter can be implemented in any number of ways that are equivalent to the above, as will be evident to a person skilled in the art in view of the present description.

Any one of the adjustments of operation 570 can cause the counter to reach the limit, in which case the decision at operation 530 could be different. Once the limit is reached, a flag can be set, or a state machine can transition to a different state. Accordingly, operation 530 can be performed by checking the flag or a current state of the state machine.

In some embodiments, the first command includes an attempted password, as specified by the protocol. Examples include the Kill command, which can kill a tag, or the Access command, which can access more sensitive functions of the tag. Such commands include an attempted password, which the tag must deem valid before it complies with the command.

An optional operation 580 can be performed within flowchart 500. If it is determined that the attempted password is valid, flowchart 500 can be performed as before. But if it is determined that the attempted password is not valid, then the counter can be further adjusted, as a penalty. Operation 580 is useful if someone without authorization is trying to gain access to the sensitive functions of the tag, and lacks the password that a legitimate owner would have for their protection.

The validity or not of the attempted password can be determined by checking the received bits of the attempted password as they correspond to respective bits of a password stored in tag memory. In addition, the counter can be adjusted by an amount in relation to how many of the attempted password bits differ from their corresponding bits of the first password. This way someone who misses only one bit, e.g. due to interference, would be penalized by less than someone who attempts a password at random.

Figure 6:
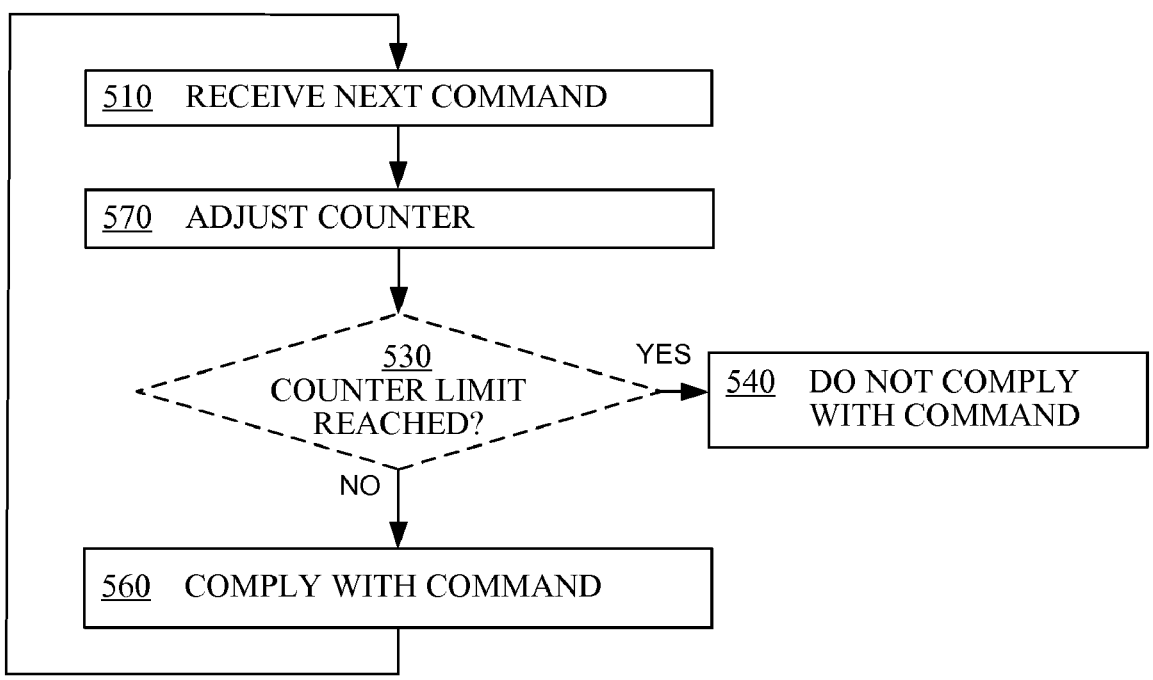
FIG. 6 is a flowchart illustrating methods for a tag according to alternate embodiments.

Operations 510, 540, 560, and 570 can be implemented in different orders according to embodiments. One such example is shown in FIG. 6, as flowchart 600.

The operations of flowchart 500, 600, and others, result in the tag having, in some embodiments only a limited number of remaining commands it will comply with. Many examples are now described, which tags according to embodiment may implement individually or in combination.

Figure 7A:
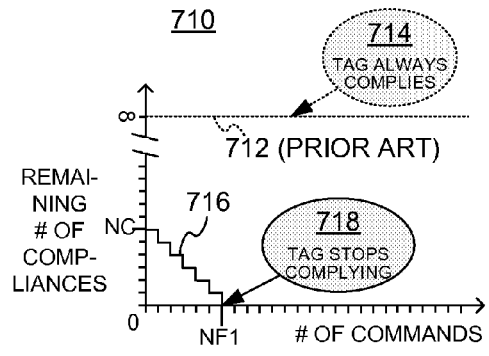
FIG. 7A is a diagram showing that an RFID tag can stop complying after receiving a limited number of commands according to embodiments.

FIG. 7A is a diagram 710, contrasting behaviors a RFID tags. In the horizontal axis there is shown a number of commands received sequentially from one or more RFID readers. In the vertical axis there is shown the remaining number of command compliances.

A horizontal behavior line 712 shows what a prior art tag does. Namely, according to a comment 714, a tag replies to all commands, as long as they are not themselves disabling commands like the Kill command. The number of remaining compliances is independent of how many commands are received, and the tag can comply indefinitely. Here the sign of infinity is used as the intercept of behavior line 712, to denote that the number of commands could be a very large one, without compliance ever stopping.

A behavior line 716 shows a behavior of a sample tag made according to embodiments. The tag starts with an initial number of remaining compliances NC, before having received any commands. With each command that is then received and complied with, behavior line 716 is decremented by one. Decrementing may take place using the above described counter. After a limited number of commands NF1, behavior line 716 drops down to zero. According to a comment 718, the tag then stops complying with commands received after that.

In the example of FIG. 7A, behavior line 716 is decremented by one for every command received. This is a specific example of a case where the counter is adjusted by the same amount for all commands. As such, NF1 is equal to NC, or a number very close to it. This need not be the case. For example, different commands can result in different adjustments. Two examples are now given.

Figure 7B:
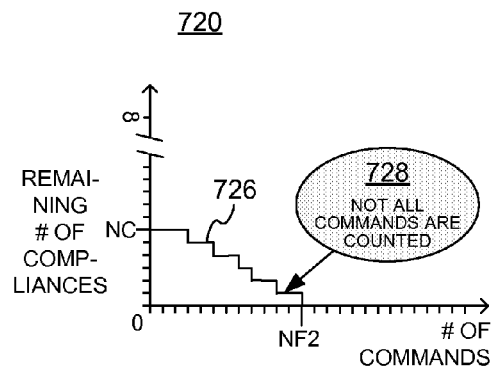
FIG. 7B is a diagram showing that an RFID tag can stop complying after receiving a limited number of commands according to additional embodiments.

FIG. 7B is a diagram 720, showing a behavior line 726 of a sample tag made according to embodiments. Behavior line 726 starts from the same initial number of remaining compliances NC as behavior line 716. According to a comment 728, however, not all commands are counted against the limit, and thus the counter is adjusted only for some commands. For example, the only commands that are counted can be those where the tag has been singulated, a stored code is read, or passwords are attempted. As such, the final number is NF2, which could be larger than NC.

Figure 7C:
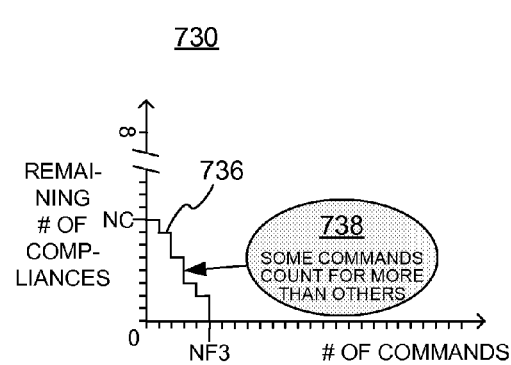
FIG. 7C is a diagram showing that an RFID tag can stop complying after receiving a limited number of commands according to yet other embodiments.

FIG. 7C is a diagram 730, showing a behavior line 736 of a sample tag made according to embodiments. Behavior line 736 starts from the same initial number of remaining compliances NC as behavior line 716. According to a comment 738, however, some commands are counted for more against the limit than other commands, and thus the counter is adjusted differently between the commands it receives. An example for penalties to be heavier is where the tag has been singulated from a population of tags. Another example has already been given above, where penalties can be heavier if an attempted password has incorrect bits. As such, the final number is NF3, and the tag could comply with fewer commands than even NC.

In some instances of the above examples, when a tag receives a first command shown as an intercept in the horizontal axis, either it complies with it and adjusts the counter, or it does not comply with it, depending on whether the counter had reached the limit by prior such adjusting.

As will be seen in the examples of behavior lines 716, 726, 736, lack of compliance can continue for at least some more of the commands received afterwards. This lack of compliance can be specific to some commands, or indiscriminately to all subsequently received commands.

In a number of embodiments, not complying can include that the tag no longer performs the first operation, even when called for by subsequent commands. That first operation could be backscattering a reply, transitioning to a certain state, and so on. But it could perform other operations, or comply with other commands.

In a number of embodiments, not complying can include that the tag no longer complies with subsequent commands, even if they are different than the first command, and/or call for an operation to be performed that is different than the first operation. In some of these embodiments, the tag has been killed. In others, this lack of compliance is temporary, and a later received command is indeed complied with, even if it is the same as the first command.

The temporary lack of compliance can be implemented by resetting the counter to an updated value, or temporarily reversing how the counter counts, or equivalently using a different counter, and so on. This updated value could be determined in any number of ways. For example, it could be determined at random, or from a preset initial value stored in tag memory.

In some embodiments, the counter is reset because it has reached the limit, and then a suitable intervening number of commands have since then been received. An example is now described.

Figure 7D:
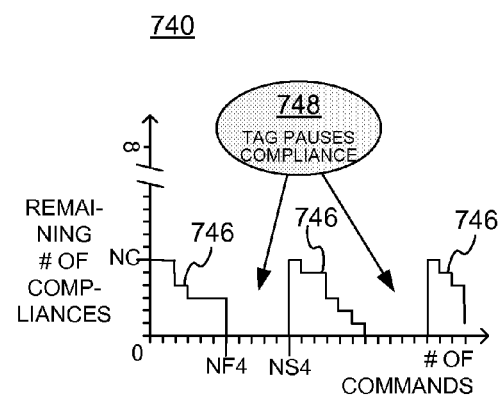
FIG. 7D is a diagram showing that an RFID tag can stop complying after receiving a limited number of commands, and then resume the pattern after non-compliance for another limited number of commands, according to embodiments.

FIG. 7D is a diagram 740, showing a behavior line 746 of a sample tag made according to embodiments. Behavior line 746 starts from the same initial number of remaining compliances NC as behavior line 716. After a number NF4 of commands, it has reached the non-compliance stage, and no longer complies with further received commands as per the above. After a few more received intervening commands, however, at a restarting number NS4, behavior line 746 jumps back up to NC, from where it continues declining. In other words, according to comment 748, compliance has only paused complying for a certain number of commands, here at least between NF4 and NS4. Behavior line 746 continues back down to zero, at which time compliance pauses again, and then it is restored, and so on.

In behavior line 746, the pause can be implemented by the tag. For example, the tag can include a pause counter, counter, after which the first counter is reset to the limit NC.

In other embodiments, compliance stops, and can be restored by the reader, instead. An example is now described.

Figure 7E:
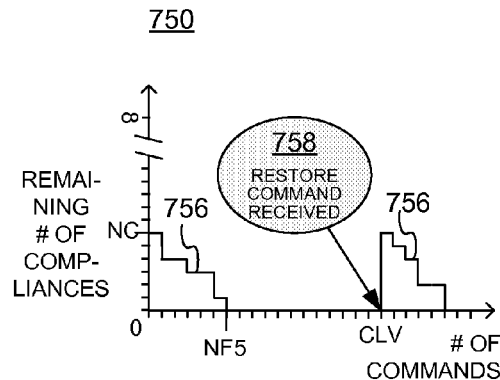
FIG. 7E is a diagram showing that an RFID tag can stop complying after receiving a limited number of commands, and then resume the pattern after it receives a Restore command, according to embodiments.

FIG. 7E is a diagram 750, showing a behavior line 756 of a sample tag made according to embodiments. Behavior line 756 starts from the same initial number of remaining compliances NC as behavior line 716. After a number NF5 of commands, it has reached the non-compliance stage, and no longer complies with further received commands as per the above. In fact, it might give the Out_Of_Cycles reply, in some optional embodiments. The, according to comment 758, a Restore command is received, at a command number CLV. This resets the counter, as seen by behavior line 756. Some of the subsequently received commands are then complied with, as per the above.

There are a number of ways of implementing the Restore command. For example, it may be implemented with a restore password, and be obeyed only if it also encodes the valid restore password. The restore password can be a separate password, or derived from other passwords stored on the tag such as an access password or a kill password. In addition, the Restore command can include a value from which the updated value is determined for resetting the counter. Other such ways are described later in this document.

In some embodiments, the counter is reset responsive to receiving a reset command. Importantly, a Reset command, can be implemented before the tag has reached the end of its compliance. An example is now described.

Figure 7F:
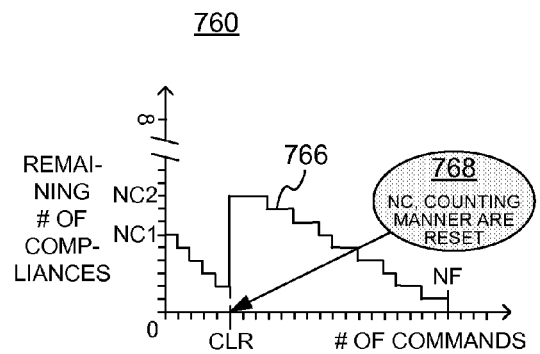
FIG. 7F is a diagram showing that an RFID tag can stop complying after receiving a limited number of commands, but where the limit is changed by a Reset command according to embodiments.

FIG. 7F is a diagram 760, showing a behavior line 766 of a sample tag made according to embodiments. Behavior line 766 starts from initial number of remaining compliances NC1. As commands are received, behavior line 766 declines, showing the declining remaining number of available compliances. At command number CLR, a Reset command is received. According to comment 768, the counter is reset to a different value NC2, and therefore some of the subsequently received commands are then complied with, as per the above. Value NC2 can be determined from the Reset command.

In some embodiments, not only the counter is reset, but also the manner of how the counter is adjusted. As will be seen in the example of FIG. 7F, behavior line 766 starts with the profile of behavior line 716, but it continues with the profile of behavior line 726, responsive to the Reset command.

In some optional embodiments, an Inquire command is received by the tag, as part of a custom limiting command subset. If the counter had not been reached the limit, a reply can be backscattered that indicates a state of the counter with respect to the limit. This way a reader will know when to send the Reset command for maximum effect.

In some embodiments, the whole feature of limiting the number of compliances is disabled. An example is now described.

Figure 7G:
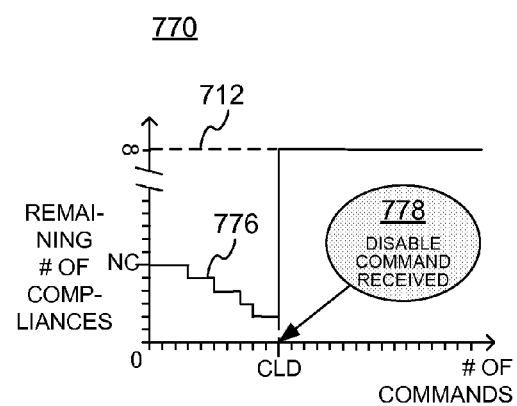
FIG. 7G is a diagram showing that an RFID tag can start reaching its limit of compliance, but then the feature becomes disabled according to embodiments.

FIG. 7G is a diagram 770, showing a behavior line 776 of a sample tag made according to embodiments. Behavior line 776 starts from initial number of remaining compliances NC. As commands are received, behavior line 776 declines, showing the declining remaining number of available compliances. According to comment 778, at command number CLD, a Disable command is received. Then behavior line 772 coincides with behavior line 712 of FIG. 7A, performing all commands without limitation as per the above.

Disabling the feature can be implemented in any number of ways. For example, the counter can be disabled, or be no longer adjusted, or no longer be paid any attention, as to whether it reached or exceeded the limit, and so on.

In some embodiments, a tag starts without the feature of limiting the number of compliances, but then that feature is enabled. An example is now described.

Figure 7H:
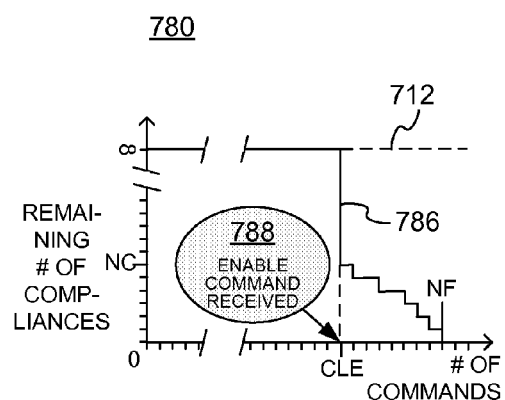
FIG. 7H is a diagram showing that an RFID tag can start by complying with an indefinite number of commands, but then transition to where it would stop complying beyond a limited number of subsequently received commands, according to embodiments.

FIG. 7H is a diagram 780, showing a behavior line 786 of a sample tag made according to embodiments. Behavior line 786 starts from coinciding with behavior line 712 of FIG. 7A, performing all commands without limitation as per the above. According to comment 788, at command number CLE, an Enable command is received. Then behavior line 782 jumps down to number NC, and from then on it declines, showing the declining remaining number of available compliances. Enabling the feature can be implemented in any number of ways, for example the inverse of the ways described with reference to FIG. 7G.

Figure 8:
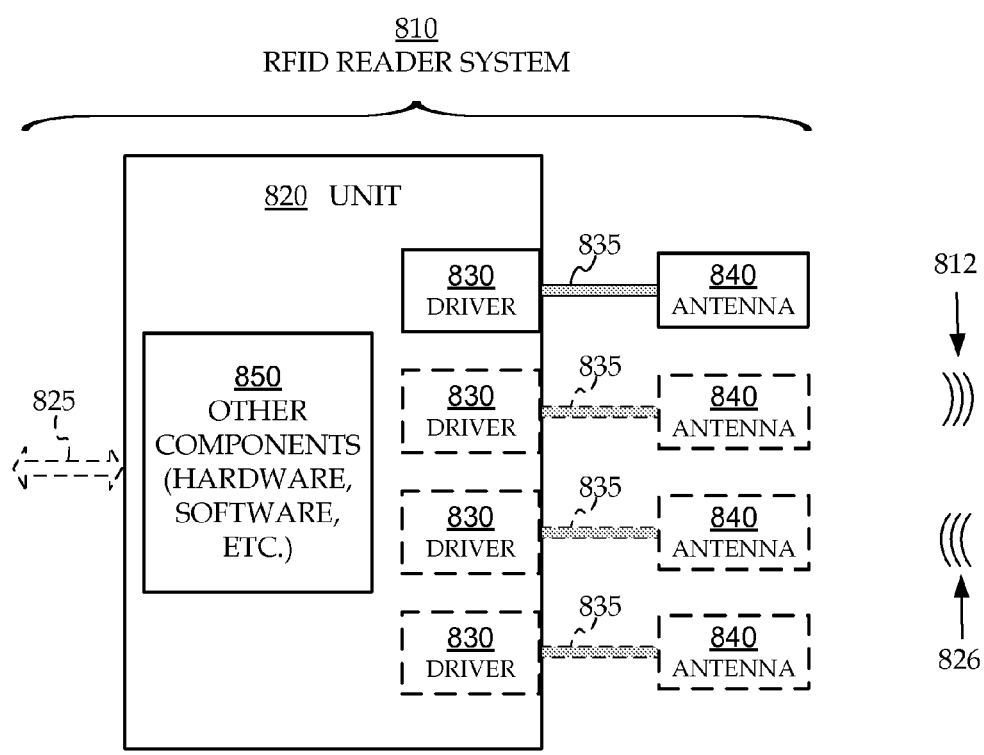
FIG. 8 is a block diagram showing a detail of an RFID reader system according to embodiments.

FIG. 8 is a block diagram showing a detail of an RFID reader system 810, which can be the same as reader 110 shown in FIG. 1. A unit 820 is also known as a box 820, and has at least one antenna driver 830. In some embodiments it has four drivers 830. For each driver 830 there is an output device for a connector. The output device is typically a coaxial cable plug. Accordingly connectors 835 can be attached to the output devices of the provided respective drivers 830, and then connectors 835 can be attached to respective antennas 840.

A driver 830 can send to its respective antenna 840 a driving signal that is in the RF range, which is why connector 835 is typically but not necessarily a coaxial cable. The driving signal causes the antenna 840 to transmit an RF wave 812, which is analogous to RF wave 112 of FIG. 1. In addition, RF wave 826 can be backscattered from the RFID tags, analogous to RF wave 126 of FIG. 1. Backscattered RF wave 826 then ultimately becomes a signal sensed by unit 820.

Unit 820 also has other components 850, such as hardware and/or software and/or firmware, which may be described in more detail later in this document. Components 850 control drivers 830, and as such cause RF wave 812 to be transmitted, and the sensed backscattered RF wave 826 to be interpreted. Optionally and preferably there is a communication link 825 to other equipment, such as computers and the like, for remote operation of system 810.

Figure 9:
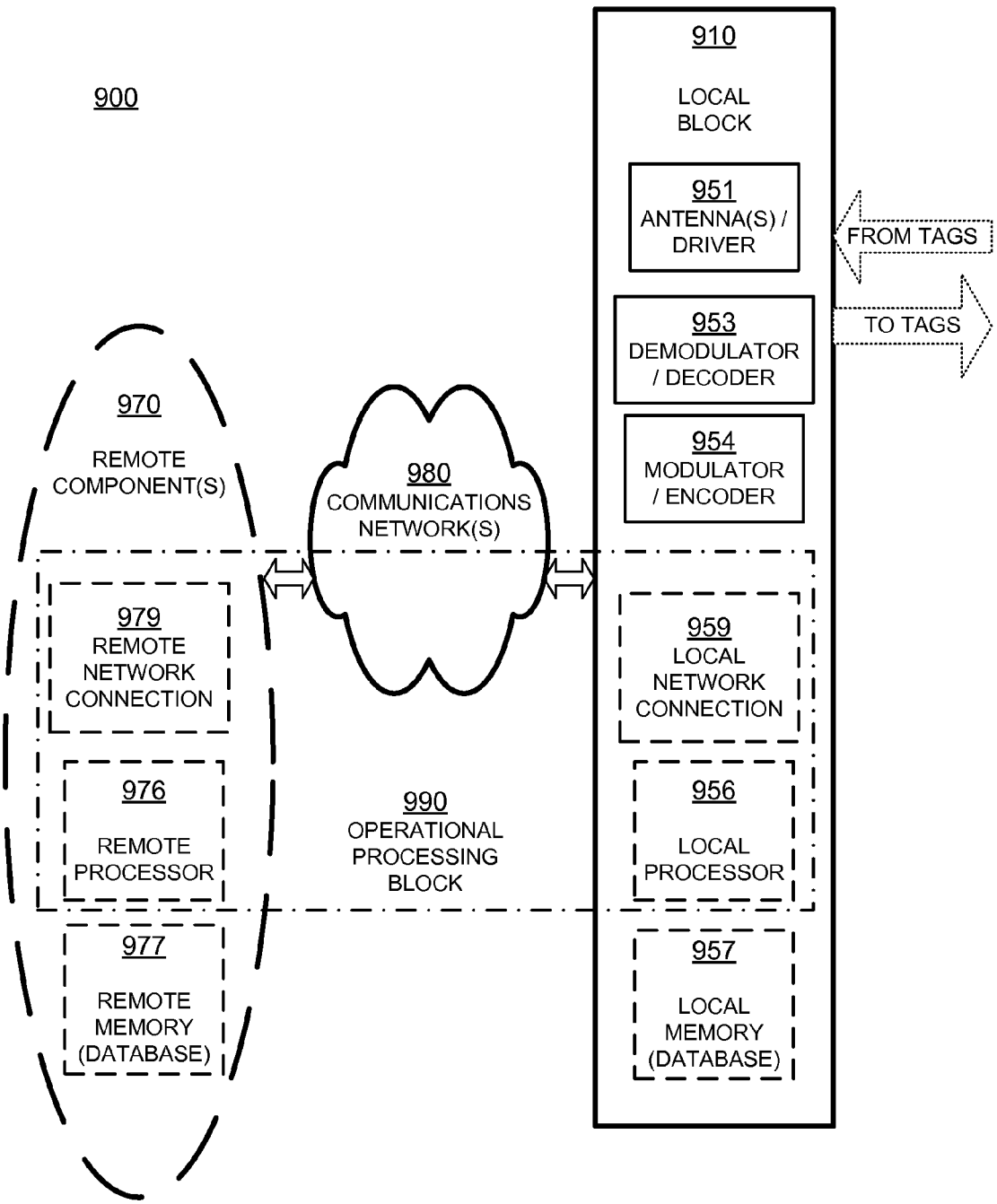
FIG. 9 is a block diagram of a whole RFID reader system according to embodiments.

FIG. 9 is a block diagram of a whole RFID reader system 900 according to embodiments. System 900 includes a local block 910, and optionally remote components 970. Local block 910 and remote components 970 can be implemented in any number of ways. It will be recognized that reader 110 of FIG. 1 is the same as local block 910, if remote components 970 are not provided. Alternately, reader 110 can be implemented instead by system 900, of which only the local block 910 is shown in FIG. 1. Plus, local block 910 can be unit 420 of FIG. 4.

Local block 910 is responsible for communicating with the tags. Local block 910 includes a block 951 of an antenna and a driver of the antenna for communicating with the tags. Some readers, like that shown in local block 910, contain a single antenna and driver. Some readers contain multiple antennas and drivers and a method to switch signals among them, including sometimes using different antennas for transmitting and for receiving. And some readers contain multiple antennas and drivers that can operate simultaneously. A demodulator/decoder block 953 demodulates and decodes backscattered waves received from the tags via antenna block 951. Modulator/encoder block 954 encodes and modulates an RF wave that is to be transmitted to the tags via antenna block 951.

Local block 910 additionally includes an optional local processor 956. Processor 956 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases some or all of the decoding function in block 953, the encoding function in block 954, or both, may be performed instead by processor 956.

Local block 910 additionally includes an optional local memory 957. Memory 957 may be implemented in any number of ways known in the art. Such ways include, by way of examples and not of limitation, nonvolatile memories (NVM), read-only memories (ROM), random access memories (RAM), any combination of one or more of these, and so on. Memory 957, if provided, can include programs for processor 956 to run, if provided.

In some embodiments, memory 957 stores data read from tags, or data to be written to tags, such as Electronic Product Codes (EPCs), Tag Identifiers (TIDs) and other data. Memory 957 can also include reference data that is to be compared to the EPC codes, instructions and/or rules for how to encode commands for the tags, modes for controlling antenna 951, and so on. In some of these embodiments, local memory 957 is provided as a database.

Some components of local block 910 typically treat the data as analog, such as the antenna/driver block 951. Other components such as memory 957 typically treat the data as digital. At some point there is a conversion between analog and digital. Based on where this conversion occurs, a whole reader may be characterized as "analog" or "digital", but most readers contain a mix of analog and digital functionality.

If remote components 970 are indeed provided, they are coupled to local block 910 via an electronic communications network 980. Network 980 can be a Local Area Network (LAN), a Metropolitan Area Network (MAN), a Wide Area Network (WAN), a network of networks such as the internet, or a mere local communication link, such as a USB, PCI, and so on. In turn, local block 910 then includes a local network connection 959 for communicating with network 980.

There can be one or more remote component(s) 970. If more than one, they can be located at the same location, or in different locations. They can access each other and local block 910 via network 980, or via other similar networks, and so on. Accordingly, remote component(s) 970 can use respective remote network connections. Only one such remote network connection 979 is shown, which is similar to local network connection 959, etc.

Remote component(s) 970 can also include a remote processor 976. Processor 976 can be made in any way known in the art, such as was described with reference to local processor 956.

Remote component(s) 970 can also include a remote memory 977. Memory 977 can be made in any way known in the art, such as was described with reference to local memory 957. Memory 977 may include a local database, and a different database of a Standards Organization, such as one that can reference EPCs.

Of the above-described elements, it is advantageous to consider a combination of these components, designated as operational processing block 990. Block 990 includes those that are provided of the following: local processor 956, remote processor 976, local network connection 959, remote network connection 979, and by extension an applicable portion of network 980 that links connection 959 with connection 979. The portion can be dynamically changeable, etc. In addition, block 990 can receive and decode RF waves received via antenna 951, and cause antenna 951 to transmit RF waves according to what it has processed.

Block 990 includes either local processor 956, or remote processor 976, or both. If both are provided, remote processor 976 can be made such that it operates in a way complementary with that of local processor 956. In fact, the two can cooperate. It will be appreciated that block 990, as defined this way, is in communication with both local memory 957 and remote memory 977, if both are present.

Accordingly, block 990 is location agnostic, in that its functions can be implemented either by local processor 956, or by remote processor 976, or by a combination of both. Some of these functions are preferably implemented by local processor 956, and some by remote processor 976. Block 990 accesses local memory 957, or remote memory 977, or both for storing and/or retrieving data.

Reader system 900 operates by block 990 generating communications for RFID tags. These communications are ultimately transmitted by antenna block 951, with modulator/ encoder block 954 encoding and modulating the information on an RF wave. Then data is received from the tags via antenna block 951, demodulated and decoded by demodulator/decoder block 953, and processed by processing block 990.

The invention also includes methods. Some are methods of operation of an RFID reader or RFID reader system. Others are methods for controlling an RFID reader or RFID reader system.

These methods can be implemented in any number of ways, including the structures described in this document. One such way is by machine operations, of devices of the type described in this document.

Another optional way is for one or more of the individual operations of the methods to be performed in conjunction with one or more human operators performing some of them. These human operators need not be collocated with each other, but each can be only with a machine that performs a portion of the program.

The invention additionally includes programs, and methods of operation of the programs. A program is generally defined as a group of steps or operations leading to a desired result, due to the nature of the elements in the steps and their sequence. A program is usually advantageously implemented as a sequence of steps or operations for a processor, such as the structures described above.

Performing the steps, instructions, or operations of a program requires manipulation of physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

The invention furthermore includes storage media. Such media, individually or in combination with others, have stored thereon instructions of a program made according to the invention. A storage medium according to the invention is a computer-readable medium, such as a memory, and is read by a processor of the type mentioned above. If a memory, it can be implemented in a number of ways, such as Read Only Memory (ROM), Random Access Memory (RAM), etc., some of which are volatile and some non-volatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought in terms of various interconnected distinct software modules.

This detailed description is presented largely in terms of flowcharts, algorithms, and symbolic representations of operations on data bits on and/or within at least one medium that allows computational operations, such as a computer with memory. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

Embodiments of an RFID reader system can be implemented as hardware, software, firmware, or any combination. It is advantageous to consider such a system as subdivided into components or modules. A person skilled in the art will recognize that some of these components or modules can be implemented as hardware, some as software, some as firmware, and some as a combination. An example of such a subdivision is now described.

Figure 10:
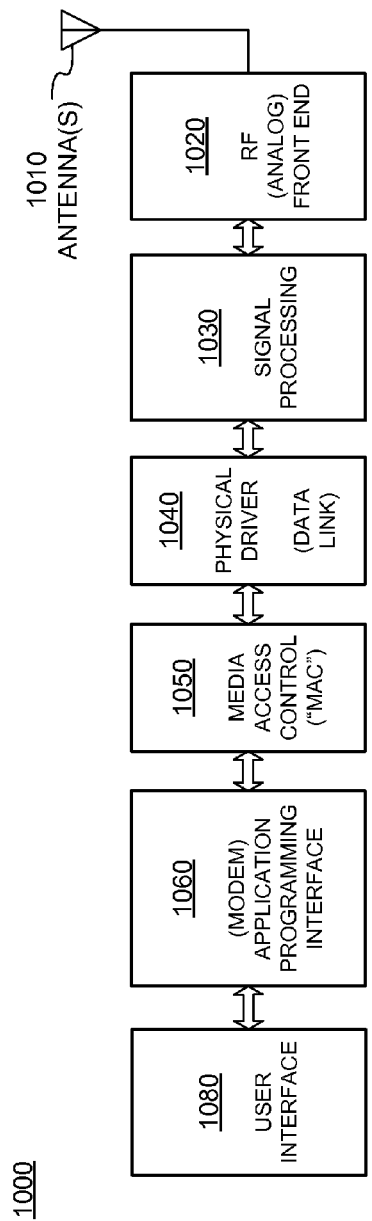
FIG. 10 is a block diagram illustrating an overall architecture of an RFID reader system according to embodiments.

FIG. 10 is a block diagram illustrating an overall architecture of an RFID reader system 1000 according to embodiments. It will be appreciated that system 1000 is considered subdivided into modules or components. Each of these modules may be implemented by itself, or in combination with others. It will be recognized that some aspects are parallel with those of FIG. 9. In addition, some of them may be present more than once.

RFID reader system 1000 includes one or more antennas 1010, and an RF Front End 1020, for interfacing with antenna (s) 1010. These can be made as described above. In addition, Front End 1020 typically includes analog components.

System 1000 also includes a Signal Processing module 1030. In this embodiment, module 1030 exchanges waveforms with Front End 1020, such as I and Q waveform pairs. In some embodiments, signal processing module 1030 is implemented by itself in an FPGA.

System 1000 also includes a Physical Driver module 1040, which is also known as Data Link. In this embodiment, module 1040 exchanges bits with module 1030. Data Link 1040 can be the stage associated with framing of data. In one embodiment, module 1040 is implemented by a Digital Signal Processor.

System 1000 additionally includes a Media Access Control module 1050, which is also known as MAC layer. In this embodiment, module 1050 exchanges packets of bits with module 1040. MAC layer 1050 can be the stage for making decisions for sharing the medium of wireless communication, which in this case is the air interface. Sharing can be between reader system 1000 and tags, or between system 1000 with another reader, or between tags, or a combination. In one embodiment, module 1050 is implemented by a Digital Signal Processor.

System 1000 moreover includes an Application Programming Interface module 1060, which is also known as API, Modem API, and MAPI. In some embodiments, module 1060 is itself an interface for a user.

All of these functionalities can be supported by one or more processors. One of these processors can be considered a host processor. Such a processor would, for example, exchange signals with MAC layer 1050 via module 1060. In some embodiments, the processor can include applications for system 1000. In some embodiments, the processor is not considered as a separate module, but one that includes some of the above-mentioned modules of system 1000.

A user interface 1080 may be coupled to API 1060. User interface 1080 can be manual, automatic, or both. It can be supported by a separate processor than the above mentioned processor, or implemented on it.

It will be observed that the modules of system 1000 form something of a chain. Adjacent modules in the chain can be coupled by the appropriate instrumentalities for exchanging signals. These instrumentalities include conductors, buses, interfaces, and so on. These instrumentalities can be local, e.g. to connect modules that are physically close to each other, or over a network, for remote communication.

The chain is used in opposite directions for receiving and transmitting. In a receiving mode, wireless waves are received by antenna(s) 1010 as signals, which are in turn processed successively by the various modules in the chain. Processing can terminate in any one of the modules. In a transmitting mode, initiation can be in any one of these modules. Ultimately, signals are transmitted internally, for antenna(s) 1010 to transmit as wireless waves.

The architecture of system 1000 is presented for purposes of explanation, and not of limitation. Its particular subdivision into modules need not be followed for creating embodiments according to the invention. Furthermore, the features of the invention can be performed either within a single one of the modules, or by a combination of them.

An economy is achieved in the present document in that a single set of flowcharts is used to describe methods in and of themselves, along with operations of hardware and/or software and/or firmware. This is regardless of how each element is implemented.

Methods are now described more particularly according to embodiments. Such methods may be practiced by different embodiments, including but not limited to RFID reader system components as described above. In addition, individual operations of such methods may be practiced by different readers, at different phases of the lifetime of an RFID tag, with or without interruptions between them, and so on.

Figure 11:
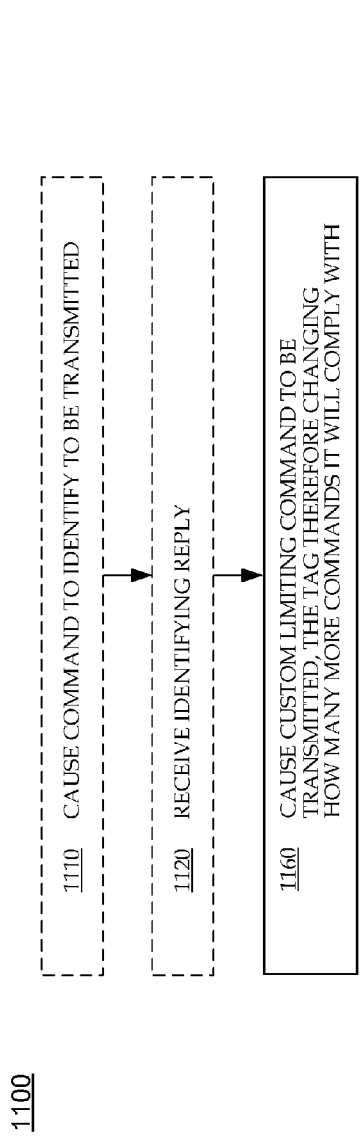
FIG. 11 is a flowchart illustrating methods for an RFID reader system component according to embodiments.

FIG. 11 is flowchart 1100 illustrating a method according to an embodiment. The method of flowchart 1100 may be practiced by different embodiments, including but not limited to the embodiments listed above, and with tags that may or may not support the feature of limiting the number of replies.

At optional operation 1110, a command to identify is caused to be transmitted to the tag.

At optional next operation 1120, an identifying reply is backscattered in response to the command to identify. The identifying reply can help the reader in identifying the tag, or its manufacturer, and therefore determine whether the feature of limiting the number of replies exists, and therefore on whether to send or not the command of the next operation.

At next operation 1160, a custom limiting command is caused to be transmitted to the tag. The tag therefore changes the remaining number of compliances, above and beyond an adjustment of the remaining number responsive to receiving the custom limiting command. The custom limiting command can be any one, or any combination of the Restore, Reset, Disable, and Enable commands. Such commands would be intermingled with other commands used to perform tag operations, and work with tags in view of the declining number of compliances.

In some embodiments, the Inquire command is caused to be transmitted. The received reply can be used to determine whether and when to send the custom limiting reply.

In the above, a number of custom limiting commands were mentioned, such as Restore, Reset, Inquire, Disable, Enable, and so on. Such commands can be considered as custom commands, by not being specified in a particular communication protocol.

Such custom commands can be constructed in any number of ways. In some instances they would be standalone commands, made by a sequence of bits chosen so that they do not conflict with other commands of the protocol. In other instances, they can be commands with a custom payload. Such commands can be known to the protocol or not, and the payload can be used to distinguish among different custom commands, and optionally further transfer a parameter for the commands.

When commands are used that are known to the protocol, a section of their payload can be advantageously used for the purpose of implementing the custom command. For example, it can be a custom limiting payload, such as a restore payload, a reset payload, an inquire payload, a disable payload, an enable payload, etc. Such a section in the payload can be a mask field, according to embodiments. For the Gen2 Spec, two such commands are the Select command and the Block-Write command. Between these two candidate commands, it should be considered that the Select command can be transmitted before or after a tag is singulated out of its population, while the BlockWrite is better suited for singulated tags. In addition, the BlockWrite command is optional to the Gen2 Spec, and the tag would probably have to have a controller that can accept it.

Each one of the custom commands can thus be constructed as an implementation of this Select command or the Block-Write command. In addition to responding to the payload implementing the custom command, the tag may further, or may not, also respond to the underlying Select command or BlockWrite command. An example is now described in terms of the Select command, but would apply equally to the Block-Write command.

FIG. 12A is a table illustrating the fields of the Select command of the Gen2 Spec. Version 1.1.0 of the Gen2 Spec is hereby incorporated by reference in its entirety. The fields of this Select command are explained in more detail in the above mentioned Gen2 Spec. In addition, the implementation of this Select command can have a custom payload so that it operates as any one of the individual custom commands.

FIG. 12B is a table illustrating how a number of custom commands can be enabled in a reader and a tag. EBV stands for Extensible Bit Vector. The Mask Field can be partitioned as shown, into two primary subfields, named FEF and FCF.

The Feature Enabling Field (FEF) enables the tag to verify that it is a proper recipient for the command, by comparing the transmitted FEF value against a value in Membank. In this case, Membank can be EPC, TID or USER memory. As can be seen, the FEF can be further partitioned into subfields, for better clarity. Such subfields can include a Class Identifier, the MDID, and an Indicator Bit.

The Class Identifier can be two bits. For example, EPCglobal can correspond to a value of 10. This would allow the custom command to apply, for example, only to EPCglobal tags.

The MDID is the tag manufacturer's ID, which is stored in the tag's TID memory. For Impinj tags, this number is 000000000001 or 100000000001. The MDID allows a reader to select tags of only the manufacturer of interest. So, even if this Select command is transmitted and received before singulation, the Select command can select also according to the tag manufacturer's ID. This will cause the manufacturer's tags to be selected, and thus the reader can ensure prior knowledge of the tag manufacturer's identification.

The Indicator Bit can be set to 0 or 1. In the Gen2 Spec, a tag model number follows the MDID. A bit of this model number can serve as the Indicator Bit, and can be interpreted as follows: If it is 0, the tags can interpret the command as an "ordinary" Select, and execute it per the Gen2 Spec. Else, if it is 1, the tags can interpret the Select command as a custom instruction, and execute according to the FCF.

The Feature Command Field (FCF) can have a command code that indicates the number of the custom instruction. For example, a command code of 00000 could be the custom timing command. This permits 31 possible custom commands. In addition, a command code of 11111 could indicate an extended command code that extends into the subsequent data field.

The data field can contain data needed to implement the custom instruction, if any. Not all commands will use it. The data field can be variable in size. Its meaning will derive from the command codes.

In some embodiments, the tag may ignore the Target and Action field in the Select command, depending on whether these fields are relevant to the CI. In other embodiments, the tag may also set the appropriate flag.

In preferred embodiments, the entire Select command must be valid for the tag to accept and execute the custom command. That means valid values for Membank, Length, Pointer, Mask, CRC-16, etc. An example is now described.

FIG. 12C is a table showing sample values that can be used for the table of FIG. 12B. These could be used for a custom timing command. The Membank having a binary value of 10 point to the TID memory. The pointer having a hex value of 06h points to the last two bits of the class identifier. The length having a hex value of 14h points to a length of 20 bits that follow thereafter.

Numerous details have been set forth in this description, which is to be taken as a whole, to provide a more thorough understanding of the invention. In other instances, well-known features have not been described in detail, so as to not obscure unnecessarily the invention.

The invention includes combinations and subcombinations of the various elements, features, functions and/or properties disclosed herein. The following claims define certain combinations and subcombinations, which are regarded as novel and non-obvious. Additional claims for other combinations and subcombinations of features, functions, elements and/or properties may be presented in this or a related document.

The invention claimed is:

1. An Integrated Circuit (IC) for use with a Radio Frequency Identification (RFID) tag, comprising:
 a processing block operable to:
  receive a first command;
  if a counter has not yet reached a predefined limit then:
   comply with the first command, and
   adjust the counter by a first adjustment amount;
  if the counter has reached the predefined limit, then:
   not comply with the first command, and
   backscatter an Out_Of_Cycles reply;
  receive a second command;
  if the counter has not yet reached the predefined limit then:
   comply with the second command, and
   adjust the counter by a second adjustment amount, wherein the second adjustment amount is different from the first adjustment amount;
  if the counter has reached the predefined limit, then:
   not comply with the second command, and
   backscatter an Out_Of_Cycles reply; and
  disable the counter in response to receiving a Disable command.

2. The IC of claim 1, wherein at least one of the first and second amounts is an increment.

3. The IC of claim 1, wherein at least one of the first and second amounts is a decrement.

4. The IC of claim 1, wherein the predefined count limit is zero.

5. The IC of claim 1, wherein one of the first and second amounts is zero.

6. The IC of claim 1, wherein the processing block is further operable to:
 in response to the counter reaching the predefined count limit, not comply with a predefined number of subsequent commands, and
 comply with a later command following the predefined number of subsequent commands.

7. The IC of claim 1, wherein the processing block is further operable to:
 in response to the counter reaching the predefined count limit, not comply with a subsequent command, and
 backscatter an $Out_{13}$ Of_Cycles reply in response to the subsequent command.

8. The IC of claim 1, wherein the processing block is further operable to:
 in response to receiving a Restore command, set the counter to a preset count value.

9. The IC of claim 1, wherein the processing block is further operable to:
 in response to receiving a Reset command, at least one of:
  set the counter to a preset count value, and
  modify at least one of the first amount and the second amount.

10. An Integrated Circuit (IC) for use with a Radio Frequency Identification (RFID) tag, comprising:
 a counter configured to adjust its count value in response to reader commands; and
 a processing block operable to:
  receive an Enable command;
  in response to the Enable command, enable the counter to start counting;
  receive a first command;
  if the counter has not yet reached a predefined limit then:
   comply with the first command, and
   adjust the counter by a first adjustment amount;
  if the counter has reached the predefined limit, then:
   not comply with the first command, and
   backscatter an Out_Of_Cycles reply;
  receive a second command;
  if the counter has not yet reached the predefined limit then:
   comply with the second command, and
   adjust the counter by a second adjustment amount, wherein the second adjustment amount is different from the first adjustment amount;
  if the counter has reached the predefined limit, then:
   not comply with the second command, and
   backscatter an Out_Of_Cycles reply; and
  disable the counter in response to receiving a Disable command.

11. The IC of claim 10, wherein the adjustment is one of an increment and a decrement.

12. The IC of claim 10, wherein the predefined count limit is zero.

13. The IC of claim 10, wherein the processing block is further operable to:
 in response to the counter reaching the predefined count limit, not comply with a predefined number of subsequent commands, and
 comply with a later command following the predefined number of subsequent commands.

14. The IC of claim 10, wherein the processing block is further operable to:
 in response to the counter reaching the predefined count limit, not comply with a subsequent command, and
 backscatter an Out_Of_Cycles reply in response to the subsequent command.

15. The IC of claim 10, wherein the processing block is further operable to:
in response to receiving a Restore command, set the counter to a preset count value.

16. The IC of claim 10, wherein the processing block is further operable to:
in response to receiving a Reset command, at least one of:
set the counter to a preset count value, and
modify at least one of the first amount and the second amount.

17. A method for a Radio Frequency Identification (RFID) tag, comprising:
receiving a first command;
if a counter has not yet reached a predefined limit then:
complying with the first command, and
adjusting the counter by a first adjustment amount;
if the counter has reached the predefined limit, then:
not complying with the first command, and
backscattering an Out_Of_Cycles reply;
receiving a second command;
if the counter has not yet reached the predefined limit then:
complying with the second command, and
adjusting the counter by a second adjustment amount, wherein the second adjustment amount is different from the first adjustment amount;
if the counter has reached the predefined limit, then:
not complying with the second command, and
backscattering an Out_Of_Cycles reply;
disabling the counter in response to receiving a Disable command, and
setting the counter to a preset count value in response to receiving a Restore command.

18. The method of claim 17, wherein one of the first and second amounts is zero.

19. The method of claim 17, further comprising:
in response to the counter reaching the predefined count limit, not complying with a predefined number of subsequent commands, and
complying with a later command following the predefined number of subsequent commands.

20. The method of claim 17, further comprising:
in response to the counter reaching the predefined count limit, not complying with a subsequent command, and
backscattering an Out_Of_Cycles reply in response to the subsequent command.

21. The method of claim 17, further comprising:
in response to receiving a Reset command, at least one of:
setting the counter to a preset count value, and
modifying at least one of the first amount and the second amount.

22. The method of claim 17, further comprising:
receiving an Enable command prior to receiving the one of the first and the second command; and
in response to the Enable command, enabling the counter to count commands.

* * * * *